(12) United States Patent
Niklewicz et al.

(10) Patent No.: US 10,190,613 B2
(45) Date of Patent: Jan. 29, 2019

(54) REMOVABLE BLIND FASTENER FOR JOINING COMPONENTS

(71) Applicant: Kwikbolt Limited, Kingston Upon Thames (GB)

(72) Inventors: Jan Niklewicz, Kingston Upon Thames (GB); Dean Carran, Kingston Upon Thames (GB)

(73) Assignee: Kwikbolt Limited, Kingston Upon Thames (GB)

( * ) Notice: Subject to any disclaimer, the term of this patent is extended or adjusted under 35 U.S.C. 154(b) by 154 days.

(21) Appl. No.: 15/441,672

(22) PCT Filed: Aug. 25, 2015

(86) PCT No.: PCT/IB2015/056426
§ 371 (c)(1),
(2) Date: Feb. 24, 2017

(87) PCT Pub. No.: WO2016/030817
PCT Pub. Date: Mar. 3, 2016

(65) Prior Publication Data
US 2017/0184141 A1  Jun. 29, 2017

(30) Foreign Application Priority Data
Aug. 26, 2014  (GB) .................................. 1415071.8

(51) Int. Cl.
*F16B 13/08* (2006.01)
*F16B 19/10* (2006.01)
*F16B 13/04* (2006.01)

(52) U.S. Cl.
CPC .......... *F16B 13/0825* (2013.01); *F16B 13/04* (2013.01); *F16B 13/08* (2013.01);
(Continued)

(58) Field of Classification Search
CPC ...... F16B 13/04; F16B 13/08; F16B 13/0825; F16B 13/0858; F16B 13/0866;
(Continued)

(56) References Cited

U.S. PATENT DOCUMENTS

| 1,278,025 A | * | 9/1918 | Salmons | ............... | F16B 13/065 |
| | | | | | 411/32 |
| 2,667,099 A | * | 1/1954 | Lewis | .................. | E21D 21/008 |
| | | | | | 411/47 |

(Continued)

FOREIGN PATENT DOCUMENTS

| DE | 102011055427 A1 | 6/2012 |
| EP | 1746293 A1 | 1/2007 |

OTHER PUBLICATIONS

PCT/IB2015/056426 International Search Report, dated Nov. 11, 2015.

*Primary Examiner* — Roberta S Delisle
(74) *Attorney, Agent, or Firm* — Schott, P.C.

(57) ABSTRACT

The present invention provides a removable blind fastener 2 having a first tubular element 4 comprising an arm portion 24, 26, 28, a second tubular element 6 comprising an arm portion 30, 31, 32, and an elongate screw member 8. The elements are arranged in telescoping relationship one with the other and which fastener, when in use as a temporary fastener, is caused to secure the component parts of an airframe by causing telescoping movement of the elements towards each other when the screw member is turned in one direction and is caused to release the component parts of the airframe by causing telescoping movement of the elements away from each other when the screw member is turned in an opposite direction. The arm portions of the elements are located in mutual juxtaposition for telescoping movement upon rotation of the screw member as aforesaid with end portions of elongate arms of the arm portions being brought (Continued)

into engagement with tapered sills 34, 36 of the first tubular element whereby the arms are caused to splay outwardly to bring the end portions into engagement with an underside of the component and moving the component into secure temporary relationship with the component of the airframe.

13 Claims, 9 Drawing Sheets

(52) U.S. Cl.
CPC .......... *F16B 13/0858* (2013.01); *F16B 19/10* (2013.01); *F16B 19/109* (2013.01); *F16B 19/1063* (2013.01); *F16B 13/0866* (2013.01); *F16B 19/1072* (2013.01)

(58) Field of Classification Search
CPC .. F16B 19/10; F16B 19/1063; F16B 19/1072; F16B 19/109
USPC .......................................................... 411/24
See application file for complete search history.

(56) References Cited

U.S. PATENT DOCUMENTS

| | | | | |
|---|---|---|---|---|
| 4,015,505 | A | | 4/1977 | Murray |
| 4,770,583 | A | * | 9/1988 | Lindberg ................ F16B 13/08 411/340 |
| 4,861,198 | A | * | 8/1989 | Stankus ................ E21D 20/025 405/259.3 |
| 5,702,216 | A | * | 12/1997 | Wu ........................ F16B 13/066 411/32 |
| 5,813,808 | A | * | 9/1998 | Wu ........................ F16B 13/068 411/24 |
| 6,129,762 | A | * | 10/2000 | Li ...................... A61B 17/0401 411/55 |
| 7,780,387 | B2 | * | 8/2010 | Talpe .................. F16B 13/0833 411/34 |
| 9,107,548 | B2 | * | 8/2015 | Hand ..................... A47K 13/12 |
| 10,060,459 | B2 | * | 8/2018 | Niklewicz ........... F16B 19/1072 |
| 2010/0172713 | A1 | | 7/2010 | Benson |

* cited by examiner

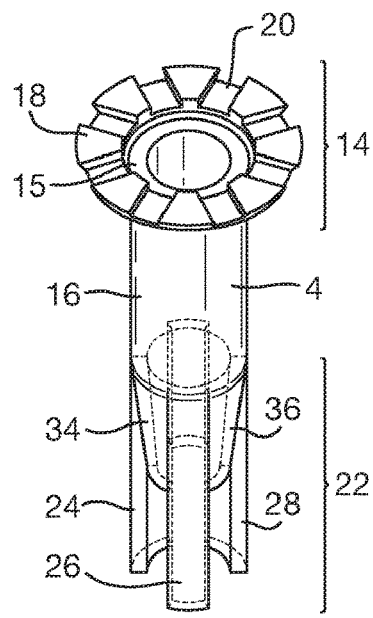
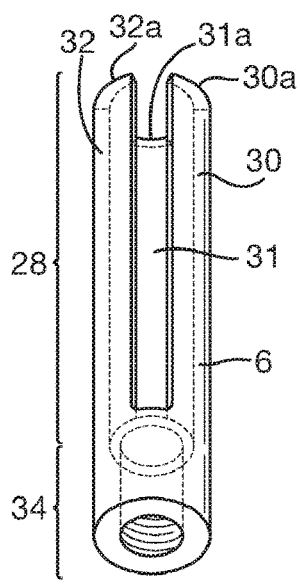
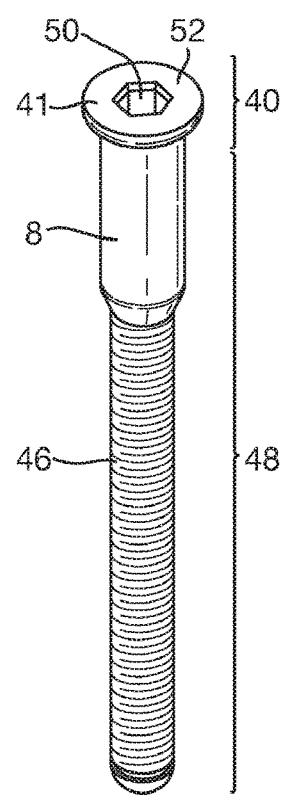

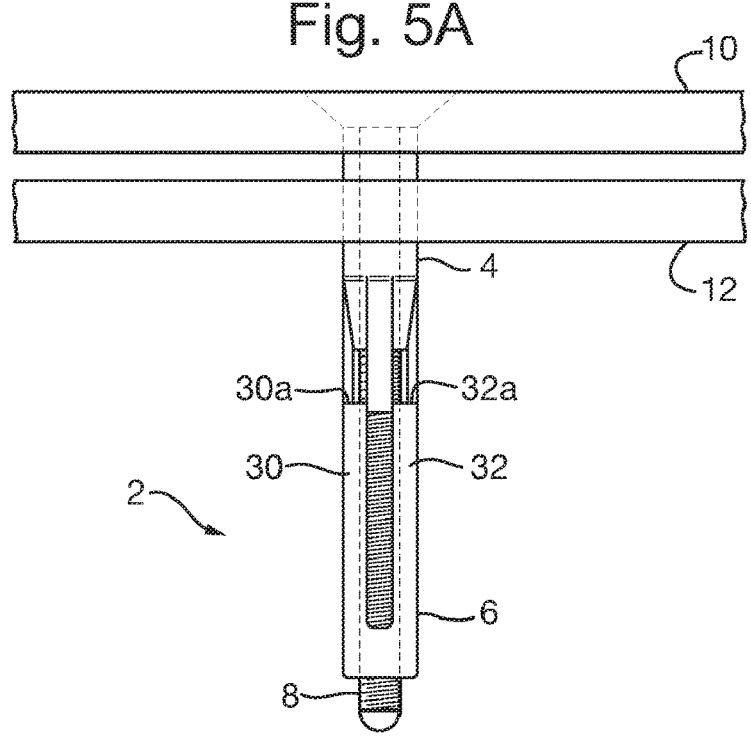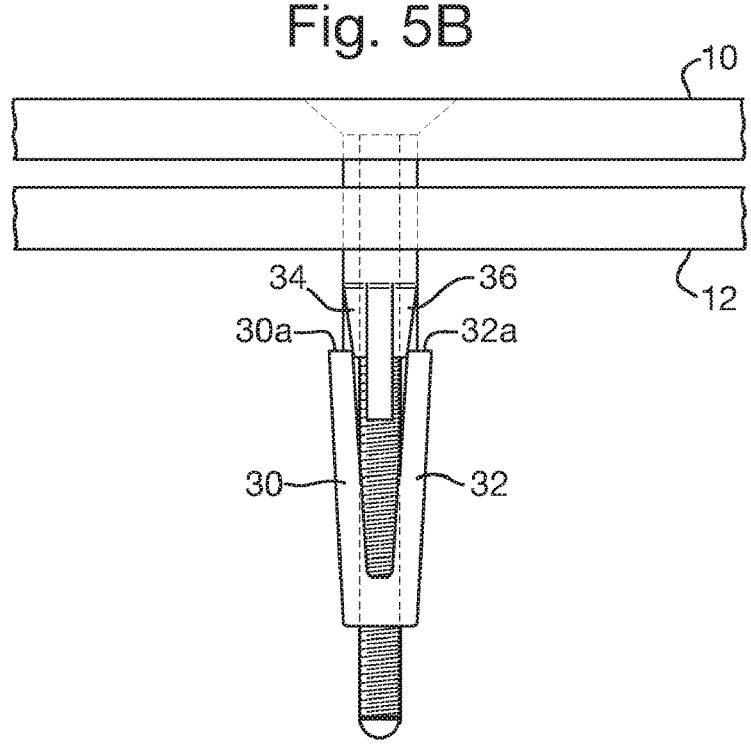

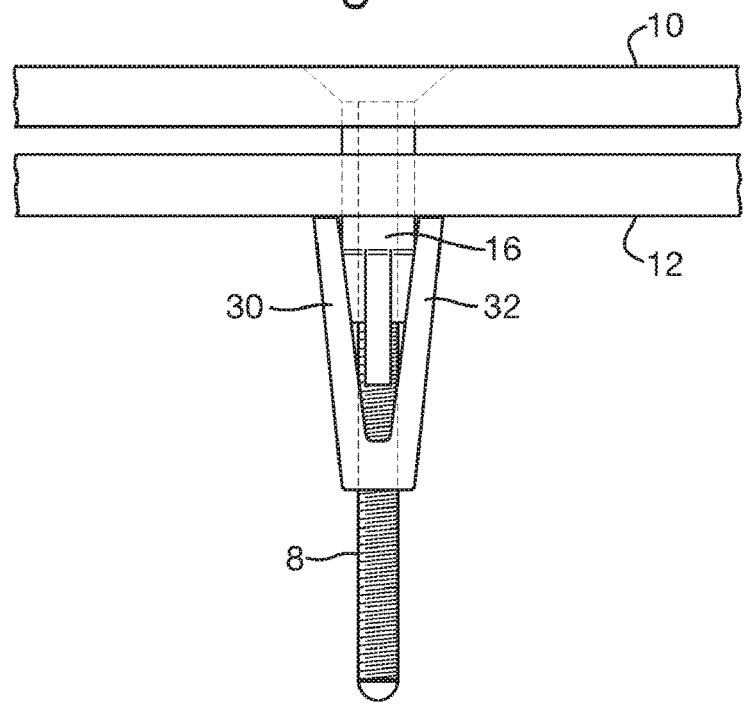
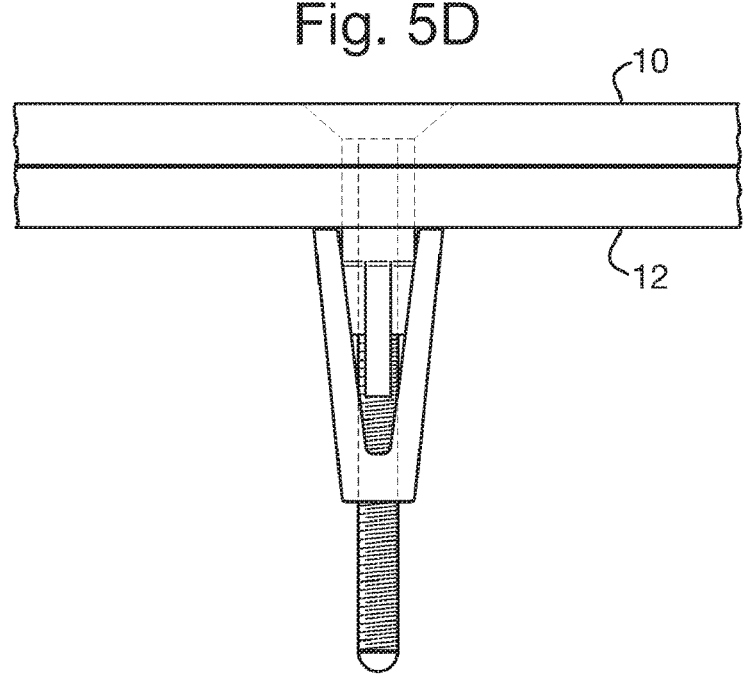

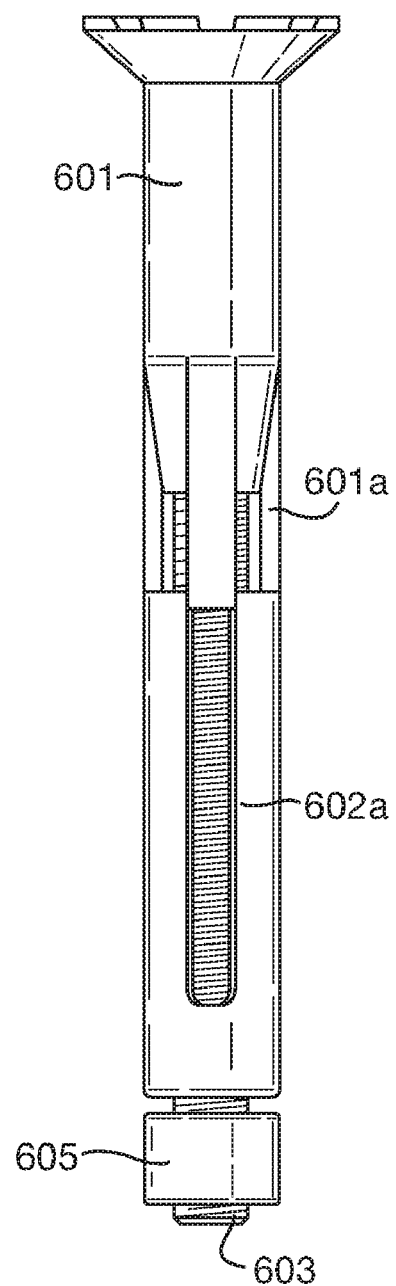

Fig. 7
Fig. 8
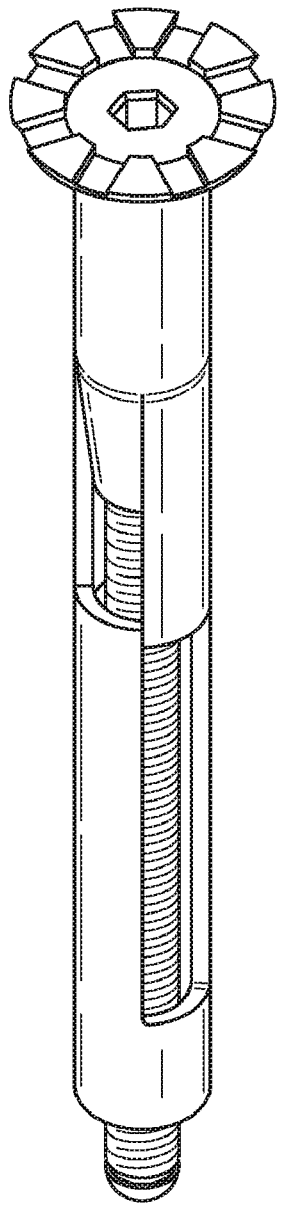
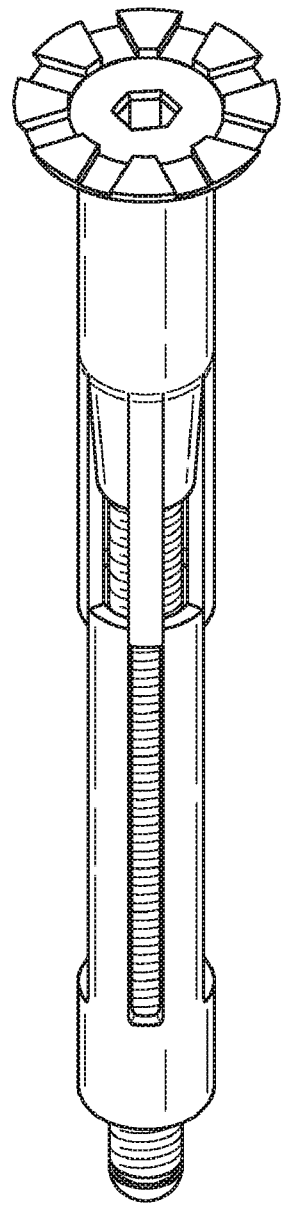

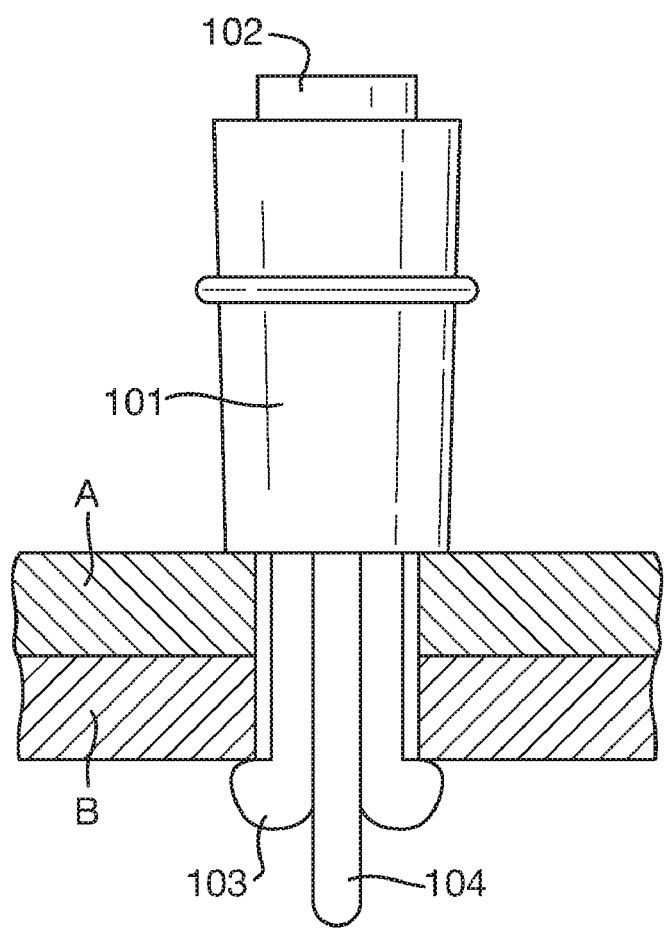

REMOVABLE BLIND FASTENER FOR JOINING COMPONENTS

BACKGROUND

Field of the Invention

The present invention is concerned with improvements in or relating to removable blind fasteners and is particularly concerned with removable blind fasteners for use in temporarily co-joining wing elements of an aircraft frame.

In the manufacture of aircraft frames, especially the wing elements, removable blind fasteners are used as a temporary fixing for the wing elements by inserting the fasteners in apertures provided in the wing elements. This is performed to determine the compatibility of the co-joined elements during an inspection process with adjustment of the apertures and alignment of the wing elements as necessary. After inspection and adjustment as required the removable blind fasteners are removed and permanent blind fasteners installed in the apertures.

Aircraft structures, such as wing sections and fuselages, are assembled by fixing sheet materials to rigid members such as spars, ribs, runners, stringers etc. In order to fix, for example, a wing-skin panel to a number of ribs, the wing-skin panel is placed over the ribs, aligned and clamped securely in place. A series of holes are drilled through the materials, and permanent fastenings such as rivets are placed and secured. For small structures clamping of the component materials can be along the edge of the materials. For large structures however it is not possible to achieve accurate alignment with this technique. For the assembly of large structures a series of clamping holes are drilled at selected points across the structure. Temporary fasteners are then inserted into these holes to secure the component materials while further holes are drilled to receive permanent rivet fasteners. When rivets have been placed and secured the temporary fasteners are removed and subsequently replaced with permanent rivet fastening. The number and location of the temporary fastenings will vary between applications, but for a typical wing set, i.e. two complete wings, for a large commercial passenger aircraft, the number of temporary fastenings used can reach around 25,000. It is convenient for such temporary fasteners to be operated from one side of the work-piece only, i.e. to insert and activate the fastener from above the work-piece without having to perform an operation on the underside of the work-piece, for instance screwing or tightening. Not only does one-sided operation simplify the assembly process, but it is often the case that the underside of a work-piece is not accessible at all. Fasteners that are operable from a single side of the work-piece are termed "blind" fasteners.

Description of Related Art

Conventionally, spring-loaded temporary fasteners are used, of the type shown in FIG. 11. The fastener has a body 101, a cap 102 and jaws 103. The jaws 103 of the fastener are biased towards, and rest against, a locating strip 104. The jaws 103 are extended by depressing the cap 102 against the action of an internal spring (not shown). Extension of the jaws 103 causes them to travel along the locating strip 104. As the jaws 103 reach the end of the strip and their width becomes narrowed. The jaws 103 may then pass through a hole between work-pieces A and B. As the pressure on the cap 102 is removed the jaws 103 retract and expand as they travel back along the locating strip 104 towards the body 101. As they expand the jaws grip the outer surface of work-piece B and pull it towards work-piece A.

As can be seen from FIG. 11, the bulk of the fastener is above the top surface of the work-piece and is therefore exposed and vulnerable and presents an obstruction on the surface of the work-piece. This is a particular problem in automated assembly processes; tool heads sweep rapidly across the surface of the materials and protruding fasteners will impede the movement of these automated tools. Another problem with the prior art shown in FIG. 11 is that the maximum clamping pressure is determined by the strength of the internal spring.

SUMMARY OF THE INVENTION

Therefore, the present invention seeks to overcome, or at least mitigate the disadvantages of the prior art. Thus the present invention conveniently provides a removable blind fastener comprising:

a) a first tubular element with a head portion at one end and a guide portion at the other end, wherein the guide portion has a plurality of guides extending away from the head end of the first tubular element in a direction parallel to the central axis of the first tubular element, the space between the guides defining guide channels, and wherein parts of the first tubular element between the guides define sills;

b) a second tubular element having a threaded portion and an arm portion, the threaded portion having an internally threaded aperture along the central axis of the second tubular element, and the arm portion having a plurality of outwardly biasable resilient arms extending away from the threaded portion in a direction parallel to the central axis of the second tubular element, wherein the number of arms is equal to the number of guide channels provided on the first tubular element and wherein the end portions of the arm portions of the second tubular member are thicker than the rest of the arm portion, to define a recess behind the end portions of the arm portion; the removable blind fastener further comprising;

c) an elongate screw member having a head portion and a threaded portion, wherein, in use, the screw member is located within the first tubular element and the second tubular element in such a way that the first tubular element, second tubular element and screw member are co-axial, and whereby the head portion of the screw member is located within the head portion of the first tubular element, and the threaded portion of the second tubular element is threaded onto the threaded portion of the screw member, such that the arms of the second tubular element can engage with the guide channels of the first tubular element, and wherein the removable blind fastener is arranged so that:

(i) rotation of the screw member in a first direction causes movement of the second tubular element towards the first tubular element in a clamping direction, this movement causing the arms of the second tubular element to move along the guide channels of the first tubular element and engage with the sills of the first tubular element, whereby continued rotation of the screw member causes the arms of the second tubular element to bias outwardly, away from the central axis of the second tubular element against the sills of the first tubular element;

and (ii) rotation of the screw member in a second direction causes movement of the second tubular element away from the first member in a releasing direction.

The recess behind the end portions of the arm portion allows the arms to be biased outward to a determined distance as the screw is tightened and remain at this distance as the screw is further tightened.

The sills of the first tubular element may be tapered, or they may be a step.

The arm portions of the second tubular element each have end portions and the thickness in a direction perpendicular to the central axis of the second tubular element of the ends of the arm portions may determine the distance that the end portions are biased away from the central axis of the second tubular element in use.

The ends of the second tubular element may have a clamping face arranged at an angle such that, when the arms are biased outward the clamping face is substantially perpendicular to the central axis of the second tubular element. This spreads the clamping load across a greater area than if only an edge of the face was engaged with the clamped component.

The arms of the second tubular element may have an arcuate cross section for strength.

The number of arms of the second tubular element may be equal to the number of guide channels of the first tubular element.

The first and second tubular elements may have two or three or four arms or more.

When assembled for use, the fastener may have a constant external diameter along its length except for the head portion of the first tubular element, the head portion of which may comprise an outwardly flared portion.

An end face of the outwardly flared portion may comprise a plurality of equally spaced radial slots.

The screw head of the elongate screw member may comprise a blind aperture to facilitate by use of a tool, when the fastener is in use, rotation of the screw in either a first or a second direction.

When the fastener is in use for temporarily co-joining elements of a component, engagement of the tool element with the spaced radial slots of the first tubular element may prevent rotation of the fastener when the elongate screw member is rotated in either its first or second directions.

The first or second tubular elements or the elongate screw member may be made from steel or carbon fibre reinforced plastic compositions.

An electrical connection may be provided for conducting electricity away from the fastener.

In an embodiment a method of temporarily co-joining first and second components using a removable blind fastener is provided wherein the components are provided with apertures with diameters slightly larger than the diameter of the removable blind fastener, the method comprising the steps of:
a) aligning the apertures of the first and second components one with the other;
b) inserting a removable blind fastener through the aligned apertures with a tapered part of the head portion of the first tubular element located in a countersunk portion of the first component;
engaging the head of the elongate screw element with a tool comprising means for location in radial slots and a blind aperture of the elongate screw element;
d) operating the tool to rotate the elongate screw element in a clockwise direction to cause telescoping movement between the first and second tubular elements thereby bringing end portions of the second tubular element into engagement with the sills of the first tubular element to cause end portions to splay outwardly beyond the maximum diameter of the removable blind fastener; and,
e) operating the tool until the splayed out end portions of the second tubular element engage with an underside of the second component to temporarily co-join the first and second components.

A method of removing a removable blind fastener from co-joined components is also provided where the tool is used to cause rotation of the elongate screw member in a first direction to effect telescoping movement of the second tubular element away from the head portion of the first tubular element and movement of the end portions of the second tubular element into alignment with the arm portion of the first tubular element in order to facilitate the withdrawal of the removable blind fastener from the co-joined components.

BRIEF DESCRIPTION OF THE DRAWINGS

FIG. 2 is a an upper perspective view of a first tubular element of the fastener illustrated in FIG. 1;

FIG. 3 is an upper perspective view of a second tubular element of the fastener illustrated in FIG. 1;

FIG. 4 is an upper perspective view of an elongate screw member of the fastener illustrated in FIG. 1;

FIG. 5A is a side view illustrating an embodiment of the fastener when inserted in a common aperture between components to be co-joined, the fastener being shown in the first phase of operation, whereby the arms of the second tubular element are flush with the outer surface of the first tubular element;

FIG. 5B is a side view illustrating an embodiment of the fastener when inserted in a common aperture between components to be co-joined, the fastener being shown in the second phase of operation, whereby the arms of the second tubular element are starting to be splayed outward against a feature of the screw member;

FIG. 5C is a side view illustrating an embodiment of the fastener when inserted in a common aperture between components to be co-joined, the fastener being shown in the third phase of operation but before clamping has taken place, whereby the arms of the second tubular element are fully splayed outward against a feature of the first tubular element;

FIG. 5D is a side view illustrating an embodiment of the fastener when inserted in a common aperture between components to be co-joined, the fastener being shown in the third phase of operation after clamping of the components has taken place, whereby the arms of the second tubular element are splayed outward and drawn toward the head end of the fastener to clamp the components together;

FIG. 6 shows an assembled fastener with a nut;

FIG. 7 shows an assembled fastener having a second tubular element with two arms;

FIG. 8 shows an assembled fastener having a second tubular element with four arms;

FIG. 11 is the prior art.

DETAILED DESCRIPTION OF THE PREFERRED EMBODIMENT

Figure 1:
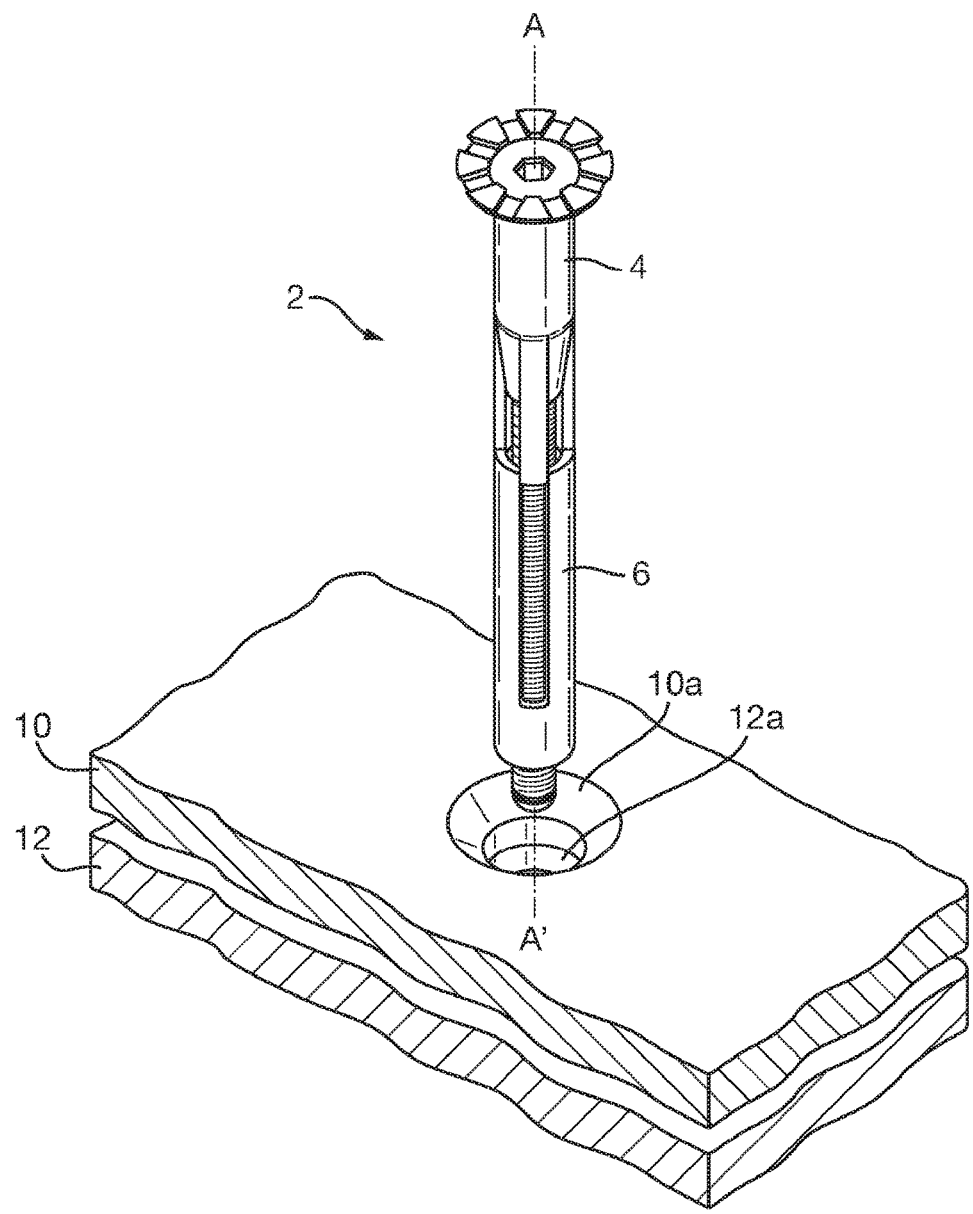
FIG. 1 is an upper perspective view of a removable blind fastener provided by the present invention, the fastener being illustrated in an operative condition.

With reference to FIG. 1, the present invention provides a removable blind fastener 2 for use in clamping two or more components together. The components are typically sheet materials, such as 10 and 12. The fastener is intended to temporarily clamp components together and is therefore easy to install and remove.

The removable blind fastener has three major parts; i) a first tubular element 4, as shown in FIG. 2; ii) a second tubular element 6 as shown in FIG. 3; and iii) an elongate screw member 8, as shown in FIG. 4.

The first tubular element 4 is a hollow tube having an internal aperture running its whole length. The first tubular element comprises a head portion 14 at an upper end portion thereof, which head portion 14 is formed with an outwardly flared portion 18, which countersinks the fastener so that it is flush with the upper surface of the clamped material. The head portion has eight equally spaced radial slots 20 for holding the first tubular element stationary while the fastener is being tightened in place. The head portion 14 also has a recess 15 for receiving the flanged head of the screw member 8, described in more detail below. The first tubular element has a central axis shown as A-A' in FIG. 1, that runs along the centre of the tubular element.

The first tubular element 4 has a dowel portion 16 below the head portion, which has a smooth cylindrical outer surface. This portion is usually a snug fit into the holes in the components 10, 12 to be clamped together and prevents the components moving relative to one another. The length of the dowel portion can be selected in dependence on the combined thickness of the two components 10, 12 to be joined.

The first tubular element 4 has a guide portion 22 below the dowel portion 16, comprised of three elongate arms that act as guides 24, 26, 28 as shown in FIG. 2 and three sills 34, 36 between the guides 24, 26, 28. The guides 24, 26, 28 protrude from the end of the first tubular element 4 in a direction parallel to the central axis A-A'. Alternatively, the first tubular element 4 may have only two guides, or if the complete fastener 2 is required to be of large diameter then four or more guides. The guides 24, 26, 28 of the first tubular element are fixed at one end (preferably by being integrally formed as part of the first tubular element 4) and free at the other end, and a space is defined between each guide. The space between each guide defines a guide channel and the sides of each guide 24, 26, 28 forms a guiding surface. The outer surface of each guide is shaped as a portion of the outer surface of a cylinder. The sills 34, 36 provide a transition from the guide channels to the outer surface of the guide portion. The sills 34, 36 provide an actuating surface. The sills are tapered to form a plane sloping between the interior and exterior of the first tubular element.

Alternatively the sills may be perpendicular to the outer surface of the fastener, and the arm ends tapered. Alternatively the sills could be non-planar, e.g. curved, or any other form.

The second tubular element 6 is a hollow tube having an internal aperture running its whole length. The first tubular element comprises an arm portion 28, comprised of three elongate arms 30, 31, 32, as shown in FIG. 3. The outside diameters of the cylinder described by the dowel portion and guide portion of the first tubular element and the arm portion of the second tubular element are substantially equal. The second tubular element 6 may have two arms, or four or more arms; the number of arms on the second tubular element 6 should equal the number of guide channels 24, 26, 28 on the first tubular element.

At an end of the second tubular element 6 and connected to the arm portion of the second tubular element 6 is an internally threaded tubular portion 34, as shown in FIG. 3. The exterior of the second tubular element is cylindrical. The arms 30, 31, 32 of the second tubular element are fixed at one end (preferably by being integrally formed as part of the second tubular element 6) and free at the other end, and a space is defined between each arm. The outer surface of each arm is shaped as a portion of a cylinder. The arms are resiliently biasable outwards, i.e. the arms are sprung so that when the arms are deformed outward they can spring back to their original position. This allows the fastener to be removable and re-usable. In other words, the arms of the second tubular element can flex. The arms 30, 31, 32 have ends 30a, 31a, 32a.

The arm ends 30a, 31a, 32a each have a flat face at the free end for engaging with the work-piece to be clamped, described in more detail below. For larger apertures more arms can be provided to spread the clamping load on the surface of the work-piece to be clamped.

The elongate screw member 8 is shown in FIG. 4 and comprises a head portion 40 which includes a flange 41 and a blind, hexagonal shaped aperture 50 in a head 52 of the screw member 8 for receiving a tool. The screw member 8 further comprises an externally threaded portion 46 at a lower end portion 48.

Figure 10A:
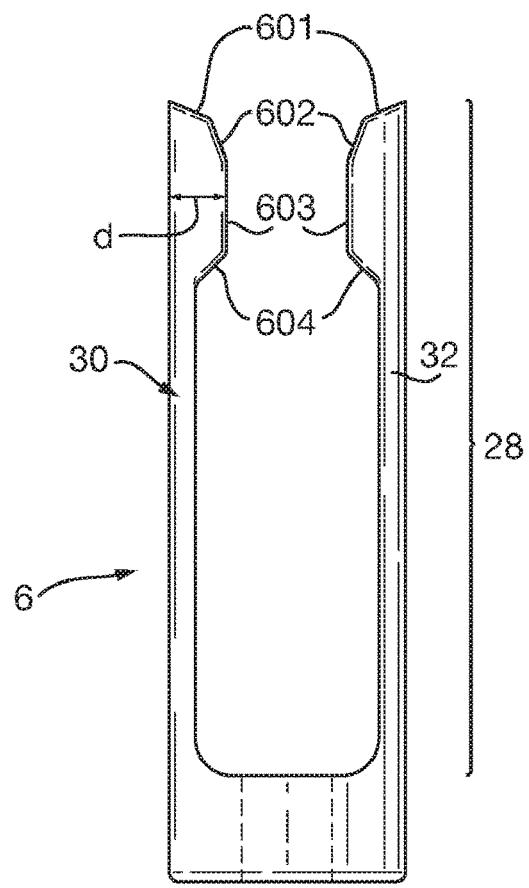
FIG. 10A is a cross sectional view of an embodiment of a second tubular element.

The arms of the second tubular element 6 may have an equal thickness along their entire length, as shown in FIG. 3, where the cross section of the arms is the same at any point along their length. Alternatively, the ends 30a, 31a, 32a of the arms may be profiled as shown in FIG. 10A which shows a cross section of second tubular element 6. It can be seen that the ends of the arms are thicker than the rest of the arm. The end of each arm 30a, 31a, 32a may comprise a work-piece engagement face 601, or clamping face, which contacts the work-piece when the fastener is in use clamping the work-pieces together. The clamping load is applied to the work-pieces via this face 601. The clamping face 601 is angled so that, when the arms are splayed outwards in use, this face is parallel to the plane of the work-pieces, and therefore the clamping load is applied evenly across this face 601. The clamping face 601 can be polished to reduce marking of the work-pieces during use. It is advantageous for this face to be as large as possible to spread the clamping load to avoid marking the work-pieces. Each of the arm ends 30a, 31a, 32a also have a taper engagement face 602, located further from the end of the arms than the clamping face 601, which engages with the sills 34, 36 of the first tubular element 4 when in use, as described in more detail below.

In an alternative embodiment (not shown), the first tubular element may not have tapered sills 34, 36, but a step transition. In this embodiment, the taper-engagement face 602 is angled so that the arms 30, 31, 32 run smoothly over the step. In a further embodiment, where tapered sills 34, 36 are provided as an actuation feature, then the taper-engagement face 602 of the arm ends 30a, 31a, 32a may be omitted. However, the combination of sills 34, 36 and a taper-engagement face 602 on the arm ends 30a, 31a, 32a is preferable.

Each of the arms also has a dowel engagement face 603, for engaging with the dowel portion 16 of the first tubular element, after engaging with the sills of the first tubular element. The dowel engagement face 603 is provided further from the end of the arms 30, 32 than the taper engagement face 602. The dowel engagement face 603 is parallel to the outer body of the second tubular member 6 and in use it maintains the outward bias of the arms as it slides along the dowel portion of the first tubular element. The distance, d, between the upper portion engagement face 603 and the outside of the arms 30, 31, 32 defines the amount by which the arms spread when in use. The arms also have a recessed face 604 further from the end of the arms 30, 31, 32 than the upper portion engagement face 603. The recessed face 604 is undercut and provides clearance so that the dowel engagement face 603 can remain in contact with the dowel portion 16 of the first tubular member when in use.

Figure 10B:
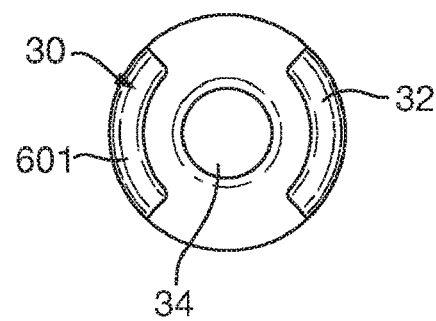
FIG. 10B is an end view of an embodiment of the second tubular member of FIG. 10A as viewed from the ends of the arm of the second tubular element.

FIG. 10B is an end view of the arms 30, 32 of the second tubular element 6. It can be seen that the arms have a curved cross section. This increases the strength of the arms and allows a greater clamping load to be applied to the work-pieces than a flat cross section.

The length of the arms 30, 31, 32 of the second tubular element 6 are chosen in dependence on the material of construction, so that the arms are biased within their elastic limit. The arms 30, 31, 32 can be thought of as sprung, where they can be biased outward by a force and then return to the same resting position when the force is removed. For a fastener of diameter 5 mm made of steel, the length of the arms 30, 31, 32 of the second tubular element are around 30 mm in length and 0.5 mm thick.

When the removable blind fastener 2 is to be used for co-joining the two airframe components 10 and 12 (also called work pieces herein), the first and second tubular elements 4 and 6 and the elongate screw member 8 are assembled to form a single unit, see FIG. 1. The three components of the fastener when assembled are coaxially aligned. For assembly, the screw element is inserted through the top of the first tubular element 4. The flange of the screw element 8 engages with the head portion of the first tubular element 6 and prevents the screw element 8 from passing right through the first tubular element 4. The second tubular element is then offered up to the screw member, with the free end of the arms directed towards the first tubular element. The screw element is turned to engage with the threaded aperture of the second tubular element 8 and is continuously turned until the arms of the second tubular element engage with the guide channels of the first tubular element 4. The arms 30, 31, 32 of the arm portion 28 of the second tubular element 6 are arranged to occupy at least part of the space defined between the arms 24, 26, 28 of the first tubular element 4, such that the arms of the first and second tubular elements can slidably inter-engage to define a generally cylindrical body for the fastener 2. The space between the arms of the first tubular element 24, 26, 28 act as guides for the arms of the second tubular element 6 and the edges of the arms of the first tubular element 4 act as a guide surface, providing a reaction force against the twisting motion imparted by the turning of the screw member 8.

When the screw member 8 is turned, the second tubular element 6 is drawn towards the first tubular element 4, the arms of each tubular element sliding past each other, while also providing a reaction force against each other to stop the second tubular member 6 rotating with the screw member 8. The second element 6 is prevented from being removed from the head end of the first element 4 because the outside diameter of the second element 6 is greater than the interior diameter of the first element. The fastener 2 is inserted as a whole unit into an aperture, as opposed to inserting each component separately and assembling the fastener in situ.

The externally threaded portion 46 of the screw member 8 may be made long in relation to the arm lengths so that the threaded portion 34 of the second tubular element 6 engages with the threaded portion 46 of the screw member 8 before the arms of the first and second tubular element engage with each other. This has the advantage that, when the screw member 8 is turned to release the fastener 2 from the work-piece, the arms of the tubular elements 4, 6 slide past each other until they disengage, and further turning of the screw member 8 will simply cause the second tubular element 6 to rotate with the screw member 8, rather than dropping off the end of the screw member 8 where it may be difficult to retrieve. This is advantageous if a machine is used to release the fastener.

In order to temporarily assemble the airframe components 10 and 12, the removable blind fastener 2 is inserted through aligned apertures provided in the components 10 and 12 as shown in FIG. 5A.

A tool, not shown, is used in the blind aperture 50 of the screw member 8 to rotate it in a clockwise direction thereby causing the second tubular element 6 to move upwardly with respect to the first tubular element 4. This action brings end portions 30a, 31a, 32a of the arms 30, 31, 32 respectively into engagement with the tapered sills 34, 36 of the first tubular element and causes the arms 30, 31 and 32 to splay outwardly, as shown in FIG. 5B.

If the arms are of a constant thickness, as shown in FIG. 3, then the arms will continue to move outward as the screw is turned. If the arms have profiled ends as shown in FIG. 10A, then arms 30, 31, 32 are then splayed to their full extent in an outward direction when the ends of the arms 30a, 32a reach the dowel portion of the first tubular element 6, as shown in FIG. 5C. Further rotation of the screw member 8 will cause movement of the arms 30, 32 in a direction parallel with the main axis of the fastener towards the work pieces, but no further movement in a direction perpendicular to the main axis of the fastener.

As the arms 30 and 32 continue to move towards the work piece they engage with an underside of the component 12 causing movement of the component 12 towards the component 10 of the airframe thereby co-joining the components 10 and 12 together as shown in FIG. 5D.

Where the ends of the arms are profiled, three phases of clamping action are defined during tightening. These phases are described below with reference to the main axis of the fastener, which is defined as the axis running along the centre of the screw member as shown as AA' in FIG. 1. The first phase is where, as the screw member 8 is rotated in a clockwise direction, the second tubular element 6 is moving toward the first tubular element 4 with the arms 30, 32 flush with the outer surface of the fastener, i.e. the outer surface of the first tubular element 4. The second phase begins as the ends 30a, 31a, 32a of the arms 30, 31, 32 begin to engage with the tapered sills 34, 36 of the first tubular element 6 and begin to splay away from, that is, in a direction perpendicular to, the main axis of the fastener, while the arms continue to move in a direction parallel to the main axis of the fastener. The second phase continues until the ends 30a, 31a, 32a reach the end of the tapered sills 34, 36 of the first tubular element 6. The third phase occurs as the ends 30a, 31a, 32a of the arms 30, 31, 32 move over the smooth dowel portion of the first tubular element 6, the third phase characterised in that now the arms are only moving in a direction parallel to the main axis of the fastener. It is preferable that the ends 30a, 31a, 32a of the arms 30, 31, 32 do not contact the underside of the component 12 until the fastener is in the third phase, when the arms are no longer moving in a direction perpendicular to the main axis of the fastener, so that the arms do not scrape the component or bite into it as they clamp onto it. Optimally the clamping action occurs in the third phase so that the full clamping load is applied in a direction parallel to the main axis of the fastener.

The arms are able to move in a direction only parallel to the main axis of the fastener by virtue of the recessed face 604 and the arms being thinner along their length than at the end; this recess provides clearance between the ends of the arms and the sills during the third phase.

In order to prevent the removable blind fastener 2 from rotating when the tool is in use, the tool also comprises means, not shown, that engage with the radial slots 20 to prevent rotation of the removable blind fastener when the elongate screw member 8 is rotated as described herein.

When it is desired to remove the fastener 2 from the co-joined components 10 and 12, the tool, not shown, is used to rotate the screw member 8 in an anticlockwise direction thereby causing the second tubular element 6 to move downwardly with respect to the first tubular element 4 whereby the end portions 30a, 31a, 32a of the arms 30, 31, 32 respectively are moved to an inoperative condition in mutual alignment with the tubular element 4 thereby enabling the removable blind fastener 2 to be removed from the aligned apertures 10a and 12a.

Typical dimensions of aperture in which the fastener 2 can be used range from 4 mm to 9 mm, although other dimensions are of course possible, for example 10 mm to 20 mm apertures. For larger apertures the three guide channels/arms of the first and second member may be substituted for four or more arms to ensure an even clamping load on the underside of the work-piece 12.

The first and second tubular elements 4 and 6 and the elongate screw member 8 may be made from any suitable metal such a steel or, alternatively these parts may be made from carbon fibre reinforced plastic compositions. Alternatively, the parts of the fastener may be fabricated from different materials, for example the first and second tubular elements made from plastic components while the screw member is made from steel.

FIG. 6 shows a three-armed fastener provided with a stop nut 605 on the end of the screw member 603. The nut 605 can be fixed to the thread of the screw member to stop the arms 602a of the second tubular element 602 from disengaging with the arms 601a of the first tubular element 601; rotation of the screw member 603 will be prevented when the second tubular element 602 reaches the nut 605, but the first and second tubular elements cannot disengage from each other.

To clamp thicker components, the dowel portion of the first tubular element can be extended.

Figure 9:
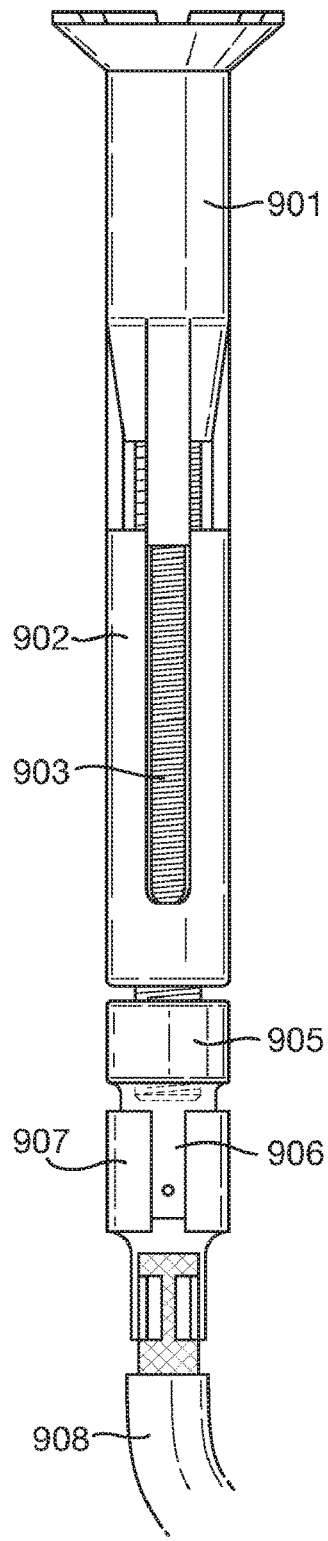
FIG. 9 is a further embodiment of the fastener having an electrical connection provided to conduct electricity.

The fastener can be an effective conductor of electricity between the outside and the inside of a structure. For example, if the fastener is used to fix electrically insulating components together, such as the composite materials of an aircraft structure, then the fastener can become an effective lightning conductor. Electrical charge can be dissipated from the fastener to a suitable point in the aircraft. The fastener can be provided with an electrical connection as shown in FIG. 9. The stop nut 905 on the screw member 903 is provided with, for example, a male blade connector 906. An electrical cable 908 can then be attached to the fastener by means of a female blade connector 907 attached to the male blade connector 906. Any other known means of attaching an electrical cable to the fastener may be used. The connectors may rotate with the nut or an arrangement may be provided to prevent the connectors from rotating with the nut, for example a bushed connection. Alternatively the electrical cable may be fixed to the centre of the screw member 8. Furthermore, the first tubular element 901 and the second tubular element 902 may both be fabricated from an insulating material, while the screw member 903 is made of an electrical conductor and this will also provide a conductive path through insulating components.

It will be appreciated that the appended claims may extend to configurations of the removable blind fastener 2 that have not been described herein in detail.

Whereas the removable blind fastener 2 has been described herein for use in co-joining the component parts of an airframe, it will be understood that the fastener 2 may be used for temporarily co-joining any components with or without additional elements that may be interposed between such components.

The invention claimed is:

1. A removable blind fastener, comprising:
   a) a first tubular element with a head portion at one end and a guide portion at the other end, wherein the guide portion has a plurality of guides extending away from the head end of the first tubular element in a direction parallel to the central axis of the first tubular element, the space between the guides defining guide channels, and wherein parts of the first tubular element between the guides define sills;
   b) a second tubular element having a threaded portion and an arm portion, the threaded portion having an internally threaded aperture along the central axis of the second tubular element, and the arm portion having a plurality of outwardly biasable resilient arms extending away from the threaded portion in a direction parallel to the central axis of the second tubular element, wherein the number of arms is equal to the number of guide channels provided on the first tubular element, and wherein the end portions of the arm portions of the second tubular member are thicker than the rest of the arm portion, to define a recess behind the end portions of the arm portion, wherein the thickness in a direction perpendicular to the central axis of the second tubular element of the ends of the arm portions determines the distance that the end portions are biased away from the central axis of the second tubular element in use; the removable blind fastener further comprising;
   c) an elongate screw member having a head portion and a threaded portion, wherein, in use, the screw member is located within the first tubular element and the second tubular element in such a way that the first tubular element, second tubular element and screw member are co-axial, and whereby the head portion of the screw member is located within the head portion of the first tubular element, and the threaded portion of the second tubular element is threaded onto the threaded portion of the screw member, such that the arms of the second tubular element can engage with the guide channels of the first tubular element, and wherein the removable blind fastener is arranged so that:
      (i) rotation of the screw member in a first direction causes movement of the second tubular element towards the first tubular element in a clamping direction, this movement causing the arms of the second tubular element to move along the guide channels of the first tubular element and engage with the sills of the first tubular element, whereby continued rotation of the screw member causes the arms of the second tubular element to bias outwardly, away from the central axis of the second tubular element against the sills of the first tubular element; and (ii) rotation of the screw member in a second direction causes movement of the second tubular element away from the first member in a releasing direction.

2. A removable blind fastener according to claim 1, wherein the sills of the first tubular element are tapered.

3. A removable blind fastener according to claim 1, wherein the ends of the second tubular element have a clamping face arranged at an angle such that, when the arms are biased outward the clamping face is substantially perpendicular to the central axis of the second tubular element.

4. A removable blind fastener according to claim 1, wherein the arms of the second tubular element have an arcuate cross section.

5. A removable blind fastener according to claim 1, wherein the number of arms of the second tubular element is equal to the number of guide channels of the first tubular element.

6. A removable blind fastener according to claim 1, wherein the first and second tubular elements have two or three or four arms.

7. A removable blind fastener according to claim 1, wherein, when assembled for use, the fastener has a constant external diameter along its length except for the head portion of the first tubular element, the head portion of which comprises an outwardly flared portion.

8. A removable blind fastener according to claim 7, wherein an end face of the outwardly flared portion comprises a plurality of equally spaced radial slots.

9. A removable blind fastener according to claim 7, wherein, when the fastener is in use for temporarily co-joining elements of a component, engagement of the tool element with the spaced radial slots of the first tubular element prevents rotation of the fastener when the elongate screw member is rotated in either its first or second directions.

10. A removable blind fastener according to claim 1, wherein the screw head of the elongate screw member comprises a blind aperture to facilitate by use of a tool, when the fastener is in use, rotation of the screw in either a first or a second direction.

11. A removable blind fastener according to claim 1, wherein the first or second tubular elements or the elongate screw member are made from steel.

12. A removable blind fastener according to claim 1, wherein the first or second tubular elements or the elongated screw member are made from carbon fibre reinforced plastic compositions.

13. A removable blind fastener according to claim 1, wherein an electrical connection is provided for conducting electricity away from the fastener.

* * * * *